United States Patent [19]

Klees

[11] 4,085,583
[45] Apr. 25, 1978

[54] METHOD FOR SELECTIVELY SWITCHING MOTIVE FLUID SUPPLY TO AN AFT TURBINE OF A MULTICYCLE ENGINE

[75] Inventor: Garry W. Klees, Mercer Island, Wash.

[73] Assignee: The Boeing Company, Seattle, Wash.

[21] Appl. No.: 709,059

[22] Filed: Jul. 27, 1976

Related U.S. Application Data

[63] Continuation of Ser. No. 563,538, Mar. 31, 1975, abandoned, and a continuation-in-part of Ser. No. 196,422, Nov. 8, 1971, Pat. No. 3,779,282, Ser. No. 226,850, Feb. 16, 1972, Pat. No. 3,792,584, and Ser. No. 329,768, Feb. 5, 1973, Pat. No. 3,854,286.

[51] Int. Cl.² ........................... F02K 3/06; F02K 3/12
[52] U.S. Cl. ........................................ 60/204; 60/262; 60/261; 60/39.17
[58] Field of Search ...................... 60/226 R, 262, 224, 60/244, 204

[56] References Cited

U.S. PATENT DOCUMENTS

| 3,016,698 | 1/1962 | Sobey | 60/262 |
|---|---|---|---|
| 3,368,352 | 2/1968 | Hewson | 60/262 |
| 3,677,012 | 7/1972 | Batscha | 60/262 |
| 3,792,584 | 2/1974 | Klees | 60/262 |
| 3,841,091 | 10/1974 | Sargisson et al. | 60/262 |
| 3,867,813 | 2/1975 | Leibach | 60/226 R |
| 3,879,941 | 4/1975 | Sargisson | 60/226 R |

FOREIGN PATENT DOCUMENTS

| 713,783 | 8/1954 | United Kingdom | 60/226 R |

Primary Examiner—Carlton R. Croyle
Assistant Examiner—Robert E. Garrett
Attorney, Agent, or Firm—Bernard A. Donahue; Laurence A. Savage

[57] ABSTRACT

Air breathing gas turbine engine design concepts, and methods and apparatus for providing variable engine cycles are disclosed. The preferred engine embodiments involve two flow control valve systems for internal management of air, each of which have the capacity to cross-over or invert adjacent annular flow patterns, and at least one of which is capable of switching from inverted to straight through flow.

4 Claims, 24 Drawing Figures

MCE TURBOFAN HIGH BYPASS MODE

Fig. 1a FORWARD FAN TURBOFAN

Fig. 1b

Fig. 2a FORWARD AND AFT TURBOFAN

Fig. 2b

Fig. 3a SINGLE SPLIT TURBOJET

Fig. 3b

Fig. 4a PART SPAN VALVE TURBOFAN

Fig. 4b

Fig. 5a — MCE TURBOFAN HIGH BYPASS MODE

Fig. 5b — MCE TURBOJET LOW BYPASS MODE

Fig. 6a

MCE TURBOFAN OPTIONAL MODE

Fig. 6b

MCE TURBOJET OPTIONAL MODE

Fig. 7d MACH 2.4 CRUISE - LOW BPR MODE - BOTH BURNERS ON

METHOD FOR SELECTIVELY SWITCHING MOTIVE FLUID SUPPLY TO AN AFT TURBINE OF A MULTICYCLE ENGINE

FIELD OF THE INVENTION

This is a continuation, of application Ser. No. 563,538, filed Mar. 31, 1975 now abandoned and a Continuation-in-Part of each of the following copending U.S. patent applications: Ser. No. 196,422 filed Nov. 8, 1971 now U.S. Pat. No. 3,779,282 entitled "Annulus Inverting Valve"; Ser. No. 226,850 filed Feb. 16, 1972 now U.S. Pat. No. 3,792,584 entitled "Increased or Variable Bypass Ratio Engines"; and Ser. No. 329,768 filed Feb. 5, 1973 now U.S. Pat. No. 3,854,286 entitled "Variable Bypass Ratio Engines". This invention relates to air breathing turbine engines and, more particularly, to methods and apparatus for providing variable engine cycles and variable bypass ratios.

BACKGROUND OF THE INVENTION

This invention is the result of continuing development work on the basic concepts set forth in the three parent U.S. patent applications referenced hereinabove. This patent application should be considered to incorporate by reference all of the detailed description and background information contained therein, since for reasons of conciseness, total repetition will not be attempted here.

It is well-known that the single bypass ratio engines in use today have not reached their performance potential because the designs have been compromised to achieve satisfactory performance at several different flight conditions. For this reason, the obtaining of variable bypass ratio and variable engine cycle characteristics have been long sought goals of aircraft engine designers. Many schemes have been proposed, but most have not been successful or practical.

OBJECTS OF THE INVENTION

A general object of this invention is to present solutions to several current problems in aircraft propulsion design, including but not limited to the following: (1) gross changes to the engine cycle for matching diverse operating requirements of commercial and military aircraft; (2) a basic change to the engine cycle currently considered required for supersonic aircraft, to provide substantially improved subsonic fuel consumption and jet-noise; (3) airflow management capability within the engine to create practical variable engine cycles to improve performance and the installed drag of the inlet and exhaust systems.

A specific object of this invention is to provide a flow control system for internal management of intake and exhaust air within a turbine engine such that the engine cycle characteristics may be selectively changed as desired for efficient or near optimum performance in more than one flight regime, and to do so with minimum impact on the continuous operation of the core gas generator system.

A further specific object of this invention is to provide a multicycle engine characterized by two flow inversion passageways which each have the capacity to cross-over or invert separated adjacent annular flow patterns within the confines of an annular passageway having an area substantially equal to the combined area of the adjacent annular flow patterns at substantially all locations along its length.

A still further related specific objective of this invention is to provide, in an engine of the type described, means for switching at least one of said flow inversion passageways from inverted to straight through flow to thereby alter the engine cycle characteristics of said engine.

SUMMARY OF THE INVENTION

This invention provides a multicycle engine (MCE) that may be switched into at least two different basic engine cycles. The engine will function efficiently as either a high pressure ratio turbofan, or as a low pressure ratio turbojet. The preferred embodiments are characterized by two special and unique flow control valve passageways which have the capacity to cross-over or invert separated adjacent annular flow patterns. In the preferred embodiments shown, at least one of the valve passageways is capable of switching from inverted to straight through flow. As shown, a switchable valve passageway (of the type fully described in the parent Patent Applications referenced hereinabove) is located between a pair of front fan stages in the forward region of the engine, and either a fixed or a switchable flow inverting passageway is located aft of the core gas generator. The various components and passageways of the engine are arranged with respect to the flow inverting passageways such that it is possible to switch the engine cycle from that of a high pressure ratio turbofan to that of a low pressure ratio turbojet.

BRIEF DESCRIPTION OF THE DRAWINGS

The eight FIGS. 1a through 4b, shown on the first sheet of drawings, schematically depict the high and low bypass modes of a forward fan turbofan, a forward and aft turbofan, a single split turbojet, and a part span valve turbofan; each engine being of the single valve type fully described in the referenced parent U.S. Patent Applications.

DESCRIPTION OF THE PREFERRED EMBODIMENTS

Figure 1A:
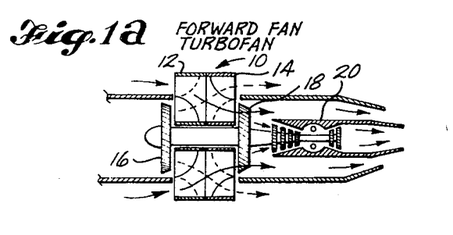
Figure 1B:
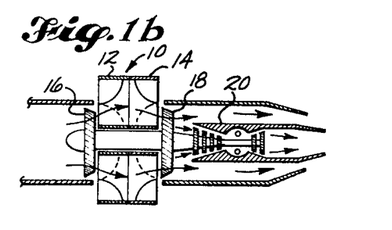
Figure 2A:
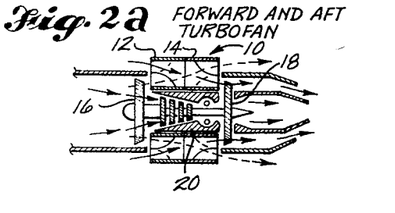
Figure 2B:
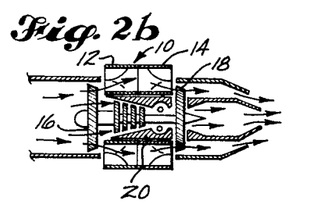
Figure 3A:
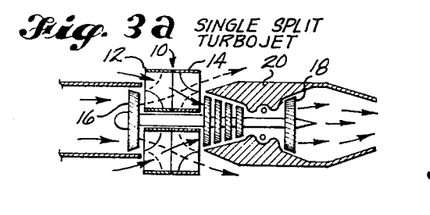
Figure 3B:
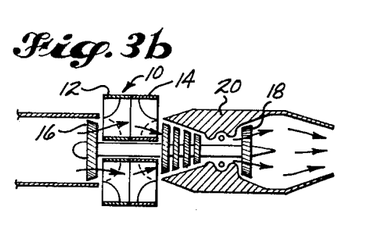
Figure 4A:
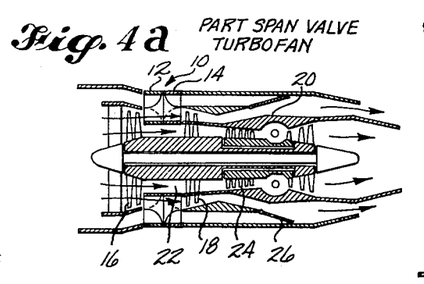
Figure 4B:
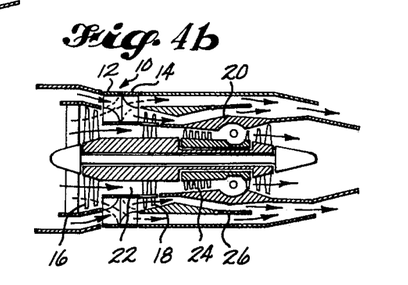

The eight FIGS. 1a, 1b through 4a, 4b on sheet 1 of the drawings schematically depict four variable bypass engines which have been fully described in the referenced parent Patent Applications. Each engine type is designated on the drawings, and shown in both the high and low bypass mode of operation. In each engine, a single means for inverting flow 10 is located between fan stages 16 and 18. The means for inverting flow is preferably an annulus inverting valve 12, 14 of the type described in the parent Patent Applications, although other flow inverting devices may be developed by persons skilled in this art. The core engine 20 is arranged in various positions, depending on the engine type. The engines of FIGS. 2 and 4 have an advantage in that the airflow into the core gas generator 20 is essentially unaffected by changes in the flow patterns through the flow inverting device. In FIG. 4, for example, flow passes through inner passage 22 directly into the compressor stages 24 without being influenced by the position of valve 12, 14, thereby allowing for smooth continuous operation of the core gas generator 20.

Figure 5A:
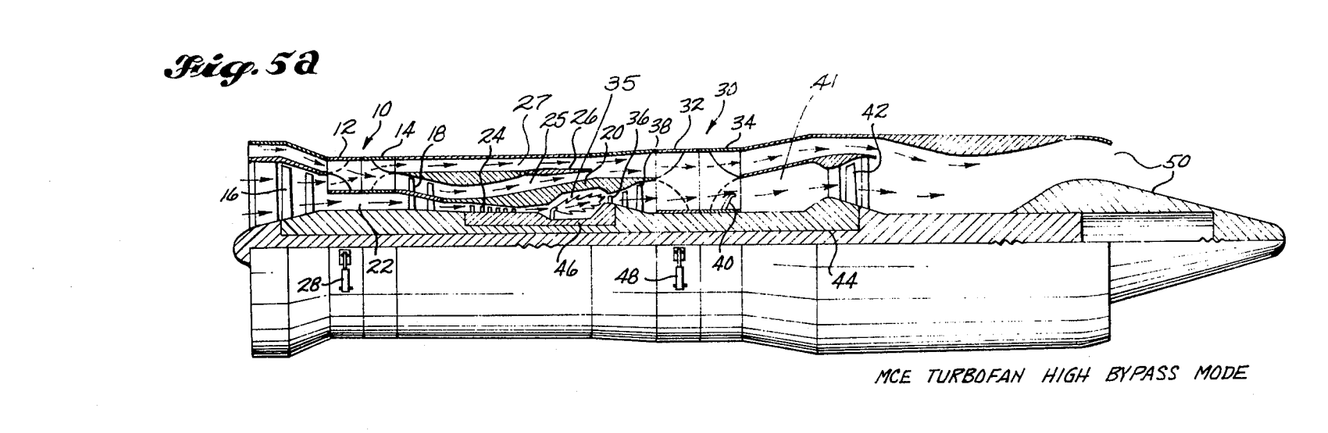
FIGS. 5a and 5b show two different modes of operation of a two-valve embodiment of this invention wherein each valve is switchable from inverted to straight through flow.

FIGS. 5a, 5b, 6a and 6c show a preferred embodiment of this multicycle engine (MCE) invention wherein two switchable means for inverting, and straightening adjacent annular flow patterns are used. For convenience in describing and discussing these MCE configurations, and those of FIGS. 7a through 7d, the following nomenclature will be used:

MCE — multicycle engine of this invention
AIV — annulus inverting valve of these inventions
SST — supersonic transport aircraft
SFC — specific fuel consumption
BPR — bypass ratio
RPM — revolutions per minute
$N_1$ — design RPM (low-spool)
$T_5$ — combustor exit temperature
$R_{fan}$ — fan pressure ratio
$R_{poa}$ — overall cycle pressure ratio
LP — low pressure
LPC — low pressure compressor
LPT — low pressure turbine
HP — high pressure
HPT — high pressure turbine
HPC — high pressure compressor
Fan 1 — fan stages forward of AIV
Fan 2 — fan stages aft of AIV
dB — decibels
$\theta$ — temperature ratio = $T_{local}(°R)/519.67$ FIG. 5a depicts a MCE embodiment in a turbofan high bypass mode, suitable for takeoff and subsonic cruise. The engine is equipped with a switchable AIV 10 having a rotatable forward portion 12 and a fixed aft portion 14. The AIV 10 is set in a flow inversion mode as indicated by the arrows on the drawing. Fan 1 is shown at 16, Fan 2 at 18 on either side of AIV 10. The core engine 20, inner passageway 22, and compression stages 24 are arranged substantially as in the FIG. 4 single valve embodiment. Located between intermediate passageway 25 and outer passageway 27 is a pivotally mounted flow control flap system 26. Actuator means for switching the mode of valve 10 is shown at 28. A second switchable AIV is provided at 30, and is set in the straight-through mode, with forward portion 32 and aft portion 34 aligned in the manner fully described in the parent Patent Applications. Core engine 20 is equipped with a burner 35, HPT stages 36, and LPT stages 38. A combustor burner element 40 is located just forward of combustion chamber 41 and aft turbine 42. Element 40 is not normally lit for this mode of operation, although it may optionally be used if desired to increase thrust at takeoff.

FIG. 5a shows a two spool engine with a HP shaft 44 and a LP shaft 46. However, as will be understood by persons skilled in this art, it could be readily modified as a three spool engine. Actuator means for switching the mode of valve 30 are shown at 48. For purposes of illustration, FIG. 5a shows a translating plug nozzle 50, although other conventional types may be used.

In the FIG. 5a mode of operation, airflow passing to the engine core through inner passageway 22 is compressed to about twenty atmospheres, with heat added in burner 35. The compressor stages 24 are driven by HPT stages 36. The forward AIV 10 splits the fan flow. Airflow entering AIV 10 exits to the nozzle 50 region after being compressed to about two and one-half atmospheres by Fans 1 and 2, located at 16 and 18 respectively. A suitable range of cycle pressure ratios, fan pressure ratios, and bypass ratios can be obtained with this general design configuration. The specific parameters discussed here were selected to suit a particular supersonic transport aircraft. The BPR of 2.5 and 20:1 pressure ratio are well suited because of low jet velocity produced at takeoff for low noise and a low SFC at subsonic cruise.

Figure 5B:
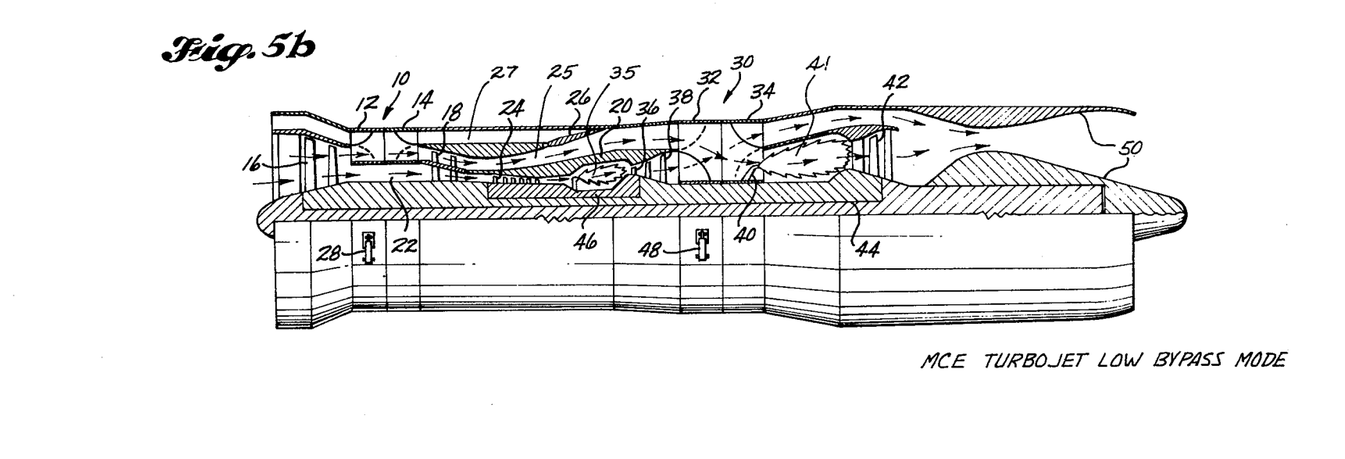

FIG. 5b shows the configuration of 5a switched to the low bypass mode for transonic climb and supersonic cruise. Both AIV 10 and AIV 30 have been switched to opposite settings. AIV 10 passes flow straight through and AIV 30 is set to invert the adjacent annular flow patterns. Burner 40 is lit and combustion occurs in chamber 41. The engine functions as a low pressure ratio turbojet. The work split between turbines 38 and 42 is appropriate. The work done on the airflow through the inner region of valve 10 is provided by turbine 42. The work split does not have to be exact for the engine cycle to behave as a low pressure ratio turbojet, and some adjustment of this work split can be made to match the flow function into turbine 42. The work done by turbine 42 must be kept at a significant level, however, to prevent the engine from becoming, in effect, an augmented turbofan. In FIG. 5b, flap 26 is moved to close flow in outer passageway 27.

Figure 6A:
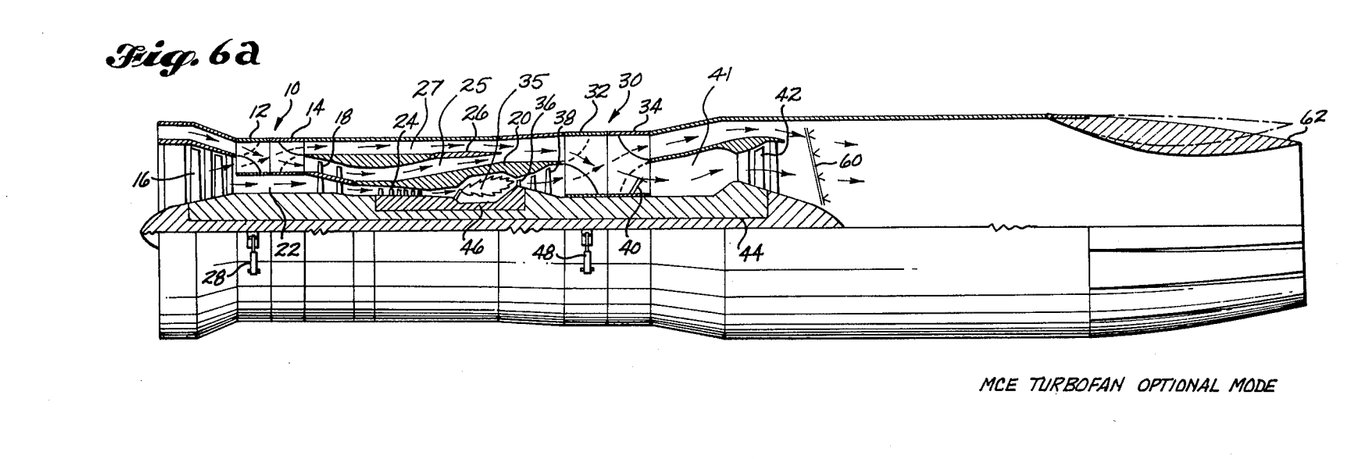
FIGS. 6a and 6b illustrate two other modes of operation for the basic engine of FIGS. 5a and 5b, and shows the use of an optional flap type nozzle rather than a plug nozzle.
Figure 6B:
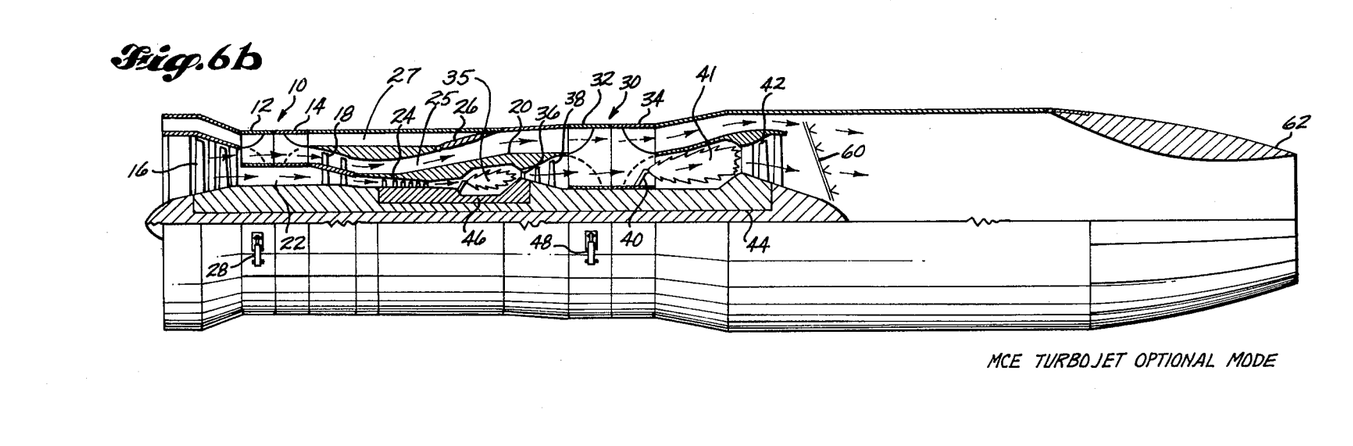

FIGS. 6a and 6b depict essentially the same engine as shown in FIGS. 5a and 5b, with the exception that an optional augmentor burner 60 and an optional flap nozzle 62 have been added, and two other and different modes of operation are shown.

In FIG. 6a, both AIV 10 and AIV 30 are set to invert or cross-over their adjacent annular flow patterns. In this mode, the use of burner 40 and augmentor 60 is optional. In general, a lower bypass ratio and pressure ratio over the FIG. 5b mode would result.

In FIG. 6b, both AIV 10 and AIV 30 are set to pass flow straight through, with burner 40 lit, and augmentor 60 used if desired. Flap 26 closes flow in outer passageway 27. The resulting mode could give medium bypass ratio of the order of 1.6 and may be useful under certain flight conditions.

FIGS. 7a, 7b, 7c and 7d show operating modes for a MCE embodiment in which the rear AIV has been fixed in the inverting flow position to provide maximum simplicity of construction for commercial aircraft application. The loss of the switching feature in the rear AIV creates a slight penalty in subsonic SFC. It should be understood that a switchable AIV may readily be incorporated here for the advantages set forth in the discussion of the FIGS. 5a through 6b embodiments.

Figure 7A:
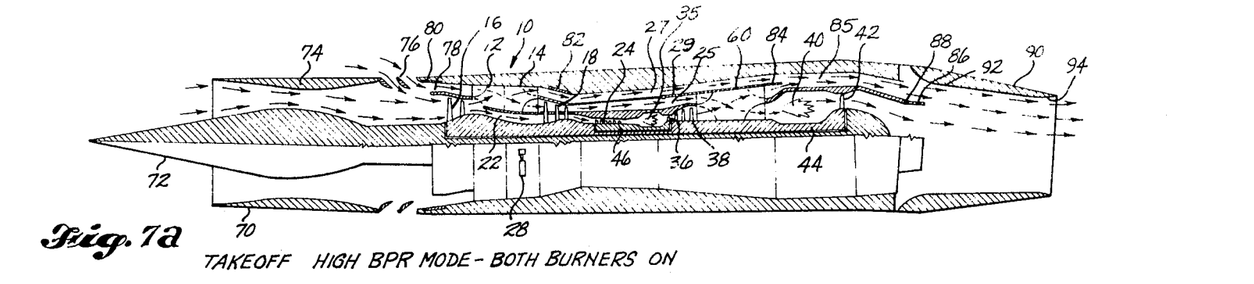
FIGS. 7a through 7d illustrate four different modes of operation of a preferred two-valve embodiment of this invention wherein only the forward valve is switchable from inverted to straight through flow.

FIG. 7a shows a MCE equipped with a switchable AIV 10 located between fans at 16 and 18. As in previous embodiments, inner passageway 22 carries airflow to compressor 24 free of influence from the setting of AIV 10. A surge bleed valve 29 is located between outer passageway 27 and intermediate passageway 25. A fixed inverting system such as an integrally constructed AIV 60 of the type shown in the parent Patent Applications and detailed in FIG. 8 of these drawings, is located between turbines 36, 38 and combustor chamber 40. An axi-symmetric inlet 70 which includes a translating centerbody 72 and a fixed throat 74 has been selected for this embodiment. Inlet bypass and intake doors 76 selectively allow flow into or away from the region of outer passageway 76. Shutoff valves 80 and 82 may be used to prevent flow in outer passageway 78. A flow divider 84 extension and an "iris" type adjustable flap system 86, pivotally mounted as at 88, may optionally be used to control nozzle flow. The outer nozzle 90 is adjustable and the diameters at 92 and 94 can be individually controlled. The mechanism of nozzle 90 is believed to be novel and therefore details are shown in FIG. 9 of these drawings.

FIG. 7a shows the MCE in the takeoff mode. The inlet doors 76 are opened to augment the main inlet airflow for high pressure recovery. The shutoff valves 80 and 82 are open to admit airflow through AIV 10 and into Fan 2 at 18. The air is compressed by Fan 2 and travels to the rear AIV 60 via passageway 25. It then is heated in combustor 40 and expands through turbine 42 and merges with the outer flow at flap 86 where it is expelled through the nozzle 90. The remainder of the inlet airflow is compressed by Fan 1 at 16 and is split into AIV 10 and inner passageway 22. Passageway 22 delivers to the LPC at 18. The airflow into AIV 10 is transmitted into outer passageway 27 as bypass air. The LPC at 18 delivers air to the HPC at 24, then to the combustor chamber where it expands through the HPT at 36 and the LPT at 38, then through fixed AIV 60 to the mixer extension 84 where the two flows co-mingle and merge with the primary stream at 86 and out of nozzle 90. The surge bleed valve 29 may be opened to allow part of Fan 2 airflow to enter in the Fan 1 duct 27. This maintains good efficiency and stability on Fan 2. If the valve remains closed, Fan 2 could be forced into an unstable surge condition. The takeoff nozzle throat are at 94 is slightly larger than the subsonic cruise area, as will be set forth in the discussion of FIG. 9. At the same time, a static pressure balance between the two adjacent streams at 86 is maintained by displacing the inner surface of the nozzle at 92. This provides adjustment of the area and static pressure at 86. This mode may be used at takeoff and through the subsonic climb-out. Variable stators are in the high-flow position for Fans 1 and 2 to achieve the highest thrust level.

The work from turbines 38 and 42 are both added together in the LP spool 44 to drive the Fans 1 and 2 and the LPC at 18. HPT 36 drives HPC 24 through the HP spool 46. Fan 2 at 18 is formed by a continuation of the LPC blades. A circumferential "rim" or "platform" is required to seal between the inner and outer annulus regions of these blades, since the LPC has been compressed to a higher pressure by Fan 1 at 16. A rotating labyrinth type seal would preferably be used to prevent flow leakage from the LPC region into the fan stream.

Figure 7B:
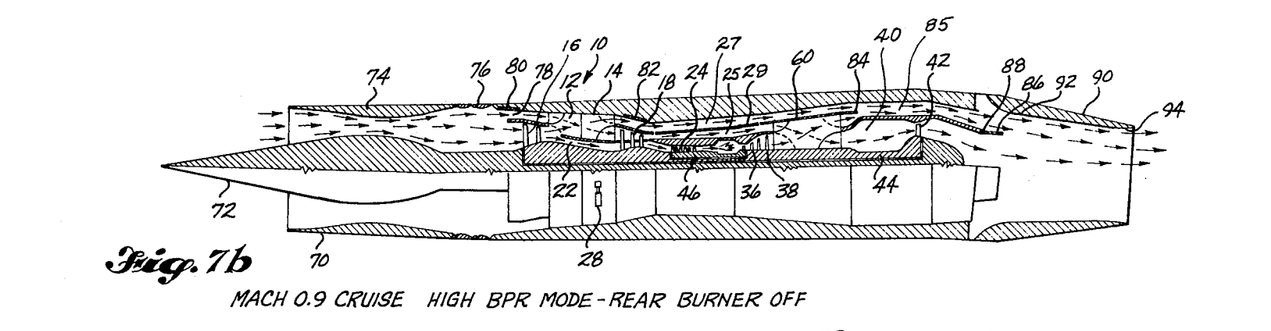

FIG. 7b shows the engine in the subsonic cruise mode. The auxiliary inlet takeoff doors 76 and the surge bleed valve 29 are closed. The aft combustor 40 is turned off. The mixer area at 86 and the nozzle throat area at 94 are adjusted for best subsonic operation. The variable stators in Fans 1 and 2 are set in the low-flow position for lowest SFC and best component match. The forward combustor is throttled back to match the airplane drag. Combustor 40 can also be used to add heat for more thrust if required for other reasons, however, the SFC may increase. This mode in all other respects is the same as the takeoff mode.

Figure 7C:
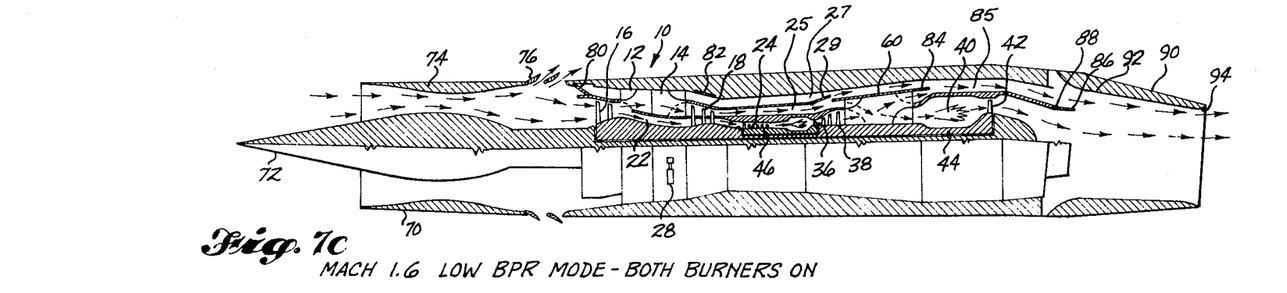

FIG. 7c shows the transonic climb mode. The inlet bypass doors 76 are opened to remove the excess inlet airflow not required by the engine. Valve 80 is closed and simultaneously forms a smooth entry into Fan 1 at 16 where the inlet airflow supply enters and is compressed. Part of this flow travels to the LPC at 18 after being split at AIV 10, the remainder of Fan 1 flow travels straight through AIV 10 into Fan 2 at 18 where it is further compressed and passed to the aft combustor 40 via intermediate passageway 25 and fixed AIV 60. Heat is added in combustor 40 and the hot flow then expands through turbine 42 and travels to the primary nozzle throat at 86 and then the flow expands to ambient pressure at the nozzle discharge point 94. The LPC flow at 18 enters the HPC 24 where it is further compressed. It then enters the combustor where heat is added and expands through HPT 36 and LPT 38. The flow leaving 38 travels through AIV 60 across the mixer extension 84. There is no flow in outer pssageway 27. Passageway 85 carries the flow to the second nozzle throat between 86 and 92. The flow expands to ambient at 94. The turbine 42 and turbine 38 work is accumulated in the LP spool 44 to drive the Fans 1 and 2 and the LPC at 18. The amount of work that turbine 42 delivers to the LP spool is roughly equal to the work of compression done by Fans 1 and 2 on the airflow in passageway 25. This would result in two turbojet cycles, but the work level and physical size of turbine 42 is a very sensitive design parameter in the MCE. The turbine 42 size and work level is usually compromised to give best performance in all areas of operation.

Figure 7D:
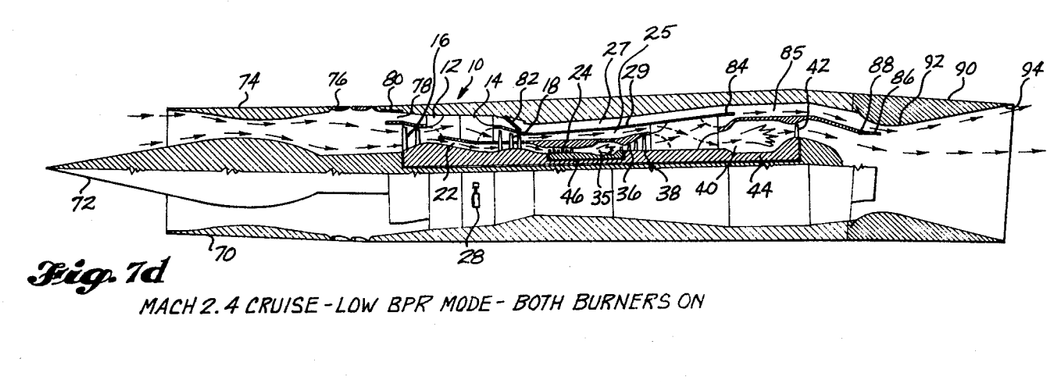

The FIG. 7d mode is essentially the same as the transonic climb mode of FIG. 7c except: (1) the inlet bypass doors 76 are closed; (2) the surge bleed valve 27 is closed; (3) combustor 40 is throttled back to match airplane drag; (4) nozzle final area at 94 is adjusted for full nozzle expansion; and (5) nozzle throat area at 92 is adjusted for best SFC. If the inlet type that is used with the MCE dictates that the inlet must be oversized for subsonic cruise airflow, then the shutoff valve 82 (or optionally 80 if it is used) may be opened partially to pass the excess inlet airflow that results from oversizing. It can be mixed with the engine airflow at 84 and it can be expelled through the main nozzle system at a low overall loss. Off-design inlet airflow matching may also be accomplished with the same method. An alternative method would be to open the bypass doors 76 to expel the excess flow. However, this may be inefficient because such doors normally form a poor nozzle and have large drag.

Figure 8:
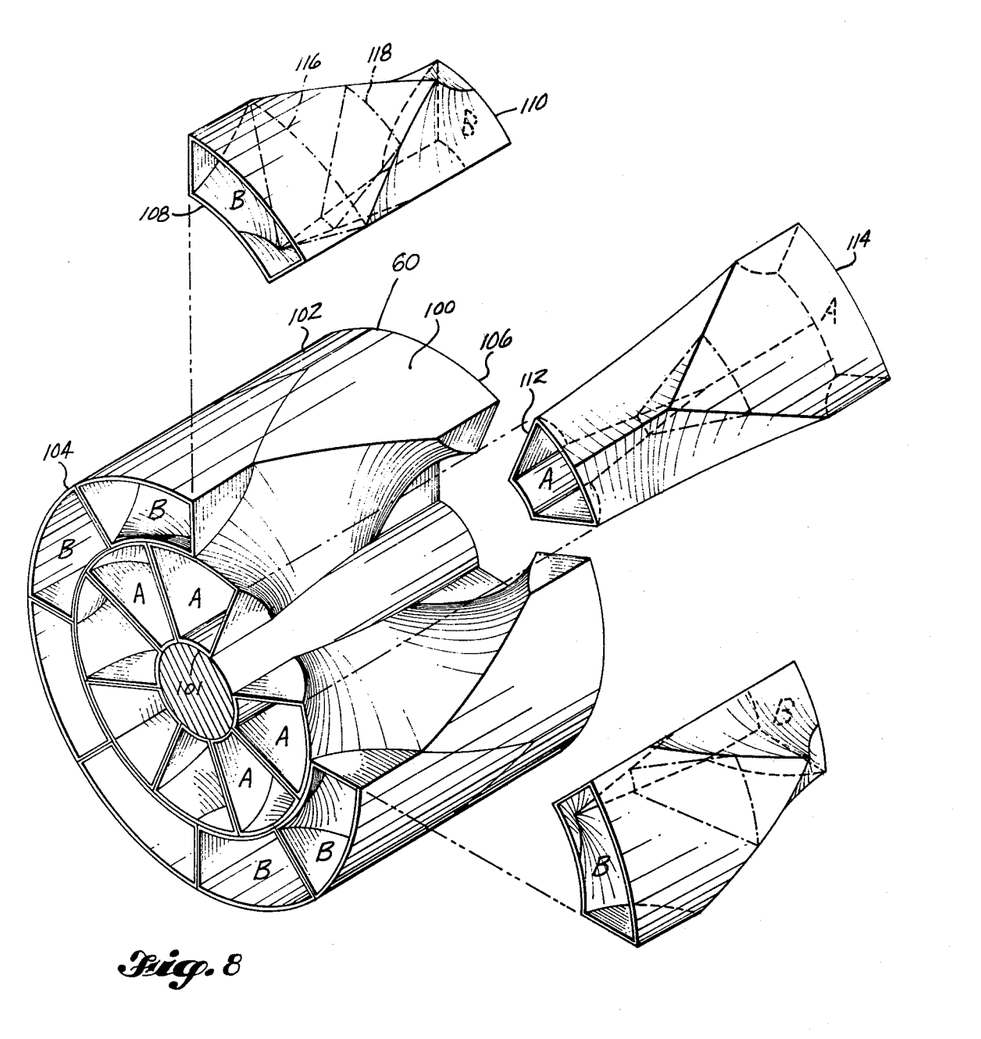
FIG. 8 is an isometric view of the fixed valve passageways of FIGS. 7a through 7d.
Figure 9:
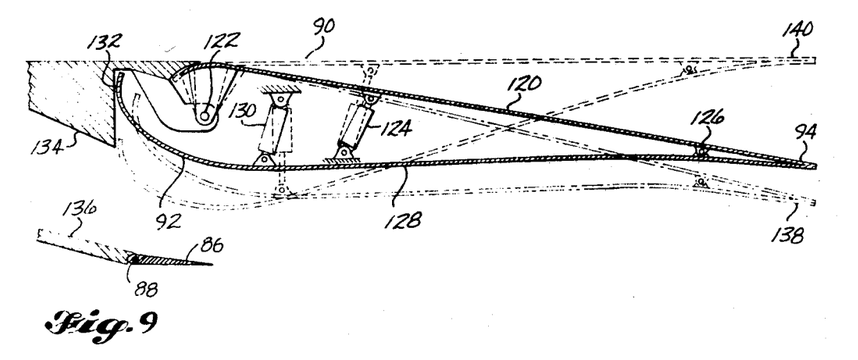
FIG. 9 is a schematic cross-section of the movable flap nozzle of FIGS. 7a through 7d.

FIG. 8 is an isometric view of the fixed AIV 60 schematically shown in FIGS. 7a - 7d, with exploded views of three of the individual duct elements. Passageway configurations of this type have been found to have good flow efficiencies. They are fully described and discussed in the parent Patent Applications. The outer surface 100 can be, and is in the configuration of FIGS. 7a - 7d, conically shaped. The inner wall surface is, but need not necessarily be, cylindrical. The passageways can be shaped to increase in area in either direction, although for ease of portrayal, FIG. 8 is shown to be substantially cylindrical. Also, if switching is not required, the passageways B and A can have unequal areas as is shown in FIG. 8. The duct elements each extend along the longitudinal extent of the passageway between the entrance end at 102 and the exit end at 104. A duct element B is isolated in FIG. 8 and shows a generally rectangular entrance section 108 which actually is a segment of an annulus extending partly across the passageway, an intermediate generally triangular section 116, intermediate generally rectangular sections 118 which are actually segments of an annulus which extend entirely across the passageway between the outer surface 100 and the inner surface 101, and corresponding sections leading to a generally rectangular exit section 110 which is a segment of an annulus extending partly across the passageway from the opposite side of the passageway from that of the entrance section 108. It should be apparent then that the AIV 60 functions to invert and cross-over adjacent annular patterns A and B within the confines of a passageway having an area substantially equal to the area of the combined two patterns at substantially all locations along its length. The parent Patent Applications contain an exhaustive treatment of this type of passageway both in the fixed integrally constructed version shown here and in the switchable version such as the AIV 10 used in FIGS. 1 through 7 of these drawings.

FIG. 9 shows a cross-section of a segment of the flap nozzle system 90 used in the FIG. 7 embodiments. The nozzle is shown in solid lines in the takeoff and subsonic cruise position. The nozzle comprises an outer wall 120 pivotally mounted at 122, an actuator 124 for positioning outer wall 120, connecting means 126 which attaches outer wall 120 to inner wall 128, an actuator 130 for positioning inner wall 128, which has a free end of appropriate curvature for providing fairing with the engine wall 134 and the wall of primary nozzle at 136. As noted previously, the primary nozzle is equipped with flap segments 86, pivotally mounted at 88 to a low flow control of the primary exhaust stream and/or control of the size of outer passageway along 136. The dotted line position at 138 may be used for transonic climb and the dotted line position at 140 is the full expansion position normally used for supersonic cruise.

DISCUSSION OF THE OPERATING CHARACTERISTICS OF THE MULTICYCLE ENGINE OF THIS INVENTION

Advantages of the MCE

The multicycle engine (MCE) of this invention is a variable cycle engine that allows selection of different engine cycles to improve performance during subsonic and supersonic flight conditions. The MCE will provide a high pressure ratio turbofan, and also a low pressure ratio turbojet. It is this capability that gives the MCE its major advantage over conventional turbojets or turbofans. The MCE has several other fundamental advantages that result from the unique flow switching capabilities that are described in the discussion that follows.

The MCE configuration shown in FIGS. 7a – 7d has been selected for the following discussion of operating characteristics. The comments made here relate specifically to this one MCE embodiment and to one mission profile analysis. They are offered by way of illustration to enable the reader to better understand some of the trade-offs in operating characteristics available with the MCE, and should not be considered to limit the scope of the invention in any way. Components have been optimized for the SST application at an advanced technology level. Current technology levels (e.g. $T_5 = 2400°$ F) may cause a reduction in BPR below that which has been assumed, but even if somewhat lower BPR is used, the advantages compared to conventional engines should be apparent to persons skilled in this art. BPR can readily be selected anywhere between 1 and 5 with the MCE concept without undue difficulty in matching components. However, the optimum fan pressure ratio reduces with increasing BPR, with an accompanying increased supersonic SFC.

In the design of MCE, it has been found that at BPR = 3 for the high bypass mode, the optimum fan pressure ratio ($R_{fan}$) for subsonic cruise gives nearly optimum pressure ratios in the low bypass mode at supersonic cruise. Also, the physical size of the ducts surrounding the engine can be fairly easily contained within a reasonable pod shape. FIGS. 7a – 7d show a realistic pod designed for Mach 2.4, where the outer cowl surfaces are determined by the inlet and nozzle flow in the low mode at supersonic cruise. The engine components and duct sizes are drawn approximately to scale, and the engine envelope will easily fit within the confines of the nacelle cowl lines. At BPR = 4 however, the ducts would be considerably larger because the density is lower (at optimum $R_{fan}$) and the quantity of flow is greater. The MGE at BPR = 4 may not fit within the desired cowl envelope, and the nacelle would have to be enlarged to accommodate the engine. This would cause the nacelle drag and weight to increase.

In certain missions subsonic SFC may play a stronger role, and increasing the BPR for reduced SFC may be desirable. This would complicate the inlet matching because the increased subsonic airflow would exceed the inlet's supply capacity. Auxiliary intakes may then be required. The engine illustrated in FIGS. 7a – 7d required about 10% more flow at subsonic cruise than the first proposed inlet could provide, and this required increasing its size by 10%, with attendant weight and drag penalties. A two-dimensional inlet design of a type known in the art could be used to increase subsonic cruise flow capacity by about 20%. However, for the airplane installation and mission under review it was elected not to use a two-dimensional inlet, for other reasons.

The ultimate choice of BPR, $R_{fan}$, and $R_{poa}$, in the MCE depends on the maximum speed of the aircraft, the relative importance of subsonic and supersonic legs of the mission, the type of inlet desired or required, and the takeoff noise and thrust requirements. Although some of these criteria have conflicting cycle requirements, the major benefits achieved with the gross change in cycle that is permitted with the MCE concept, minimizes the problems encountered in past design efforts with conventional engines.

One of the most sensitive design parameters in the MCE is the aft turbine physical size and design point. The MCE of FIGS. 7a – 7d was designed in the high BPR mode with 38% of the total LP shaft power delivered by the aft turbine, with the two fans high-flowed 10%, with the LP shaft at 105% speed, and both burners at 2800° F. Variations in aft turbine size of ±10% are normally evaluated at all key flight conditions to fine-tune the turbine size. This adjustment is accomplished by varying the amount of surge bleed at the design point. This MCE uses about 10% surge bleed (10% of Fan 2 flow) at design point.

Noise

In an SST mission, it is desirable to provide takeoff thrust at low jet noise levels. This can be accomplished by increasing the quantity of airflow and decreasing the jet velocity. The engine size is normally dictated by climb thrust requirements. However, when the engine is matched to the airplane to satisfy U.S. Federal Aviation Regulation noise requirements, takeoff thrust becomes the critical size point in the SST. Conventional engines must carry the oversized engines over the entire mission, with a large penalty in drag and weight. The MCE, however, derives a weight and drag benefit because the forward AIV provides a substantial airflow increase at takeoff. The increased airflow also provides an efficient turbofan cycle for subsonic operation. This has been estimated to save about 35% of the 50,000 lb. reserve fuel that is used for subsonic cruise to an alternate airfield and for holding purposes. When the SST flies supersonic or in transonic climb-acceleration, the MCE would be switched to the low BPR position and becomes, in principle, two ideal turbojets, concentric about each other.

Figure 10:
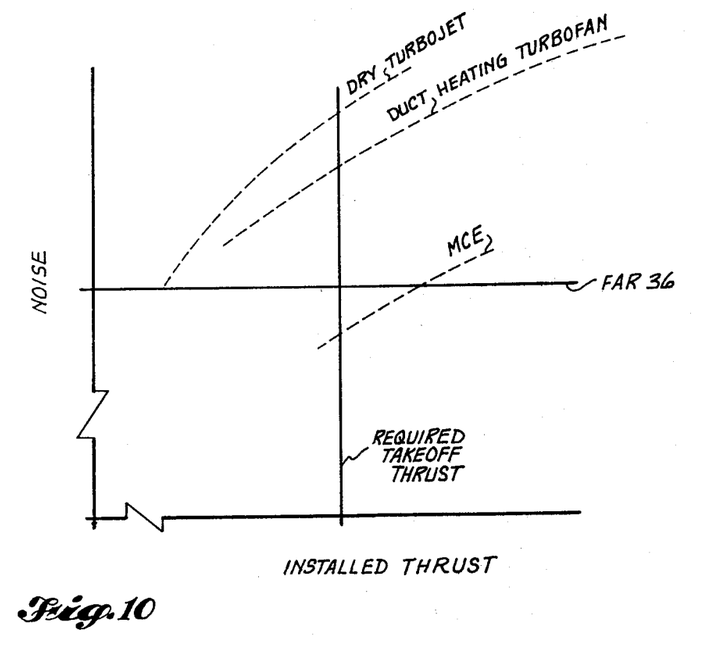
FIG. 10 is a plot of installed thrust versus noise for two conventional engines and the multicycle engine of this invention.

The jet noise characteristics of conventional engines which could be used for a typical SST aircraft are compared with those of the MCE in the plots of FIG. 10. The size of each engine was selected to best match the airplane performance requirements and to achieve minimum noise without suppression devices. The dry turbojet size is about 725 lb/sec for the SST of this example, the duct-heating turbofan is about 900 lb/sec, and the MCE is 900 lb/sec in the high mode and 600 lb/sec in the low mode. In order to provide the takeoff thrust at the lowest noise level, the turbojet is throttled back, and the turbofan's augmentor temperature is reduced. The MCE can also be throttled back to achieve reduced noise levels as indicated by the required thrust throttle-line for all three engines in FIG. 10. Since thrust is the product of mass flow and velocity, the turbofan and the MCE engine would be expected to produce about the same noise at the 900 lb/sec size shown.

Jet noise correlations made by Lighthill indicates that Jet Stream Noise is proportional to:

$$10 \log \rho^2 V_j^8 A_j = 20 \log \rho + 10 \log A_j + 80 \log V_j$$

where:

$\rho$ = DENSITY  $V_j$ = VELOCITY OF JET
$A_j$ = AREA OF JET

Reference: "On Sound Generated Aerodynamically, Part II, Turbulence as a Source of Sound" by M. J. Lighthill, Published in the Proceedings of The Royal Society of London 1954, London, England The jet noise is largely determined by the relative jet velocity in Lighthill's formula. However, the density can also contribute significantly and this is partly why the MCE is 6 dB lower in noise at the same thrust and airflow as the turbofan. The turbojet makes considerably more noise than either of the other two because its airflow is about 20% less and its jet velocity must therefore be about 20% higher.

Actual engine test measurements have shown good agreement with Lighthill's formula, however, the exponent on velocity has been found to be closer to 10 than 8 at the velocity level that is exemplified here ($V_j$ relative = 1500 to 2000 ft/sec).

A typical turbofan design compromised for best all around performance on a SST may have a $R_{fan}$ of about 3.5:1 and BPR = 2. It may have an augmentor system located in the fan duct that could be used to increase the velocity of the fan air for takeoff, climb, and supersonic cruise. The MCE with a $R_{fan}$ of about 2.5:1 is much quieter because it has lower velocity and lower density. The second fan flow is also directed through the aft turbine after being heated in the aft combustor. This lowers the pressure of the Fan 2 flow to a point where it makes very little noise because of the low density and velocity. The LP turbine flow is mixed with the Fan 1 flow and also leaves the engine at a relatively low pressure, velocity, and density. The velocity of each stream can be adjusted by controlling the nozzle area and hence the work done in each stream. In this way, the noise can be driven down while maintaining high thrust.

TABLE 1

| | JET PROPERTIES COMPARISON MACH. 30 800 FT ALTITUDE | | | |
|---|---|---|---|---|
| | Conventional Duct Heating Turbofan | | Multicycle Engine (.3 configuration) | |
| | Primary | Secondary | Primary | Secondary |
| Reference Airflow Size SLS Design (LB$_m$/SEC) | 900 | | 600/900 | |
| Actual Airflow at Takeoff | 900 | | 1000 | |
| Thrust at Takeoff (example point along throttle line) (LB$_f$) | 54,300 | | 53,000 | |
| Net Jet Velocity ($V_J$ - $V_{A/P}$)FT/SEC | 1470 | 2020 | 1744 | 1620 |
| Nozzle Total Temp. ° R(T) | 1980 | 1724 | 2800 | 1232 |
| Nozzle Pressure Ratio($P_R$) | 1.74 | 3.14 | 1.64 | 2.97 |
| Nozzle Throat Area, ft$^2$(A) | 6.95 | 7.70 | 8.2 | 8.47 |
| Relative Density = $P_R/T$ = ($\rho$) | 0.88 | 1.82 | .58 | 2.41 |
| NOISE | | | | |
| 100 log V/V$_{ref}$ | −13.8 | BASE | −6.4 | −9.5 |
| 20 log $\rho/\rho_{ref}$ | −6.3 | BASE | −9.9 | +2.4 |
| 10 log A/A$_{ref}$ | −0.4 | BASE | +0.3 | +.4 |
| TOTAL NOISE DIFFERENCE | −20.5 | BASE | −16.0 | −6.7 |
| TOTAL NOISE | BASE | | −6.7 | |

Noise level differences below 15 dB do not add any measurable noise to the dominant source (approximate +0.10 dB at −15 dB)

Table 1 shows a comparison of typical noise characteristics of a turbofan engine and the MCE. Data are shown at two similar thrust points along the engine throttle line, and the noise components due to velocity, density, and area are given for each stream in each engine. The MCE derives about 6 dB noise reduction over the turbofan at equal thrust, primarily because the dominant noise stream has a 400 ft/sec reduction in velocity. This causes a reduction in thrust; however, the primary stream velocity is greater than the turbofan. The primary streams of both engines are at least 15 dB lower in noise and they do not contribute significantly to the total noise (less than 1/10 dB). The MCE fans are high-flowed 10% for takeoff, which allows a lower jet velocity at the same thrust. The turbofan cannot derive the same benefit from high-flowed fans because the turbine work would increase significantly, driving the thrust of the primary stream to a low level, with a net effect of very little, if any, thrust increase. The MCE has two burners and two turbine streams from which it can provide the necessary work, and it therefore does not have this problem of the conventional turbofan.

Cruise Fuel Consumption

The major engine cycle characteristics such as BPR, fan pressure ratio ($R_{fan}$), or overall cycle pressure ratio, ($R_{poa}$), govern the efficiency of the engine at subsonic and supersonic cruise conditions. These parameters normally have opposite trends as to the best characteristics for each flight regime. For example, the turbofan must be designed with a compromised $R_{fan}$ and BPR to achieve its best overall performance on the airplane. Because the MCE does not suffer from this compromise, a higher BPR and lower $R_{fan}$ can be used at subsonic cruise, giving an improved subsonic SFC.

Figure 11:
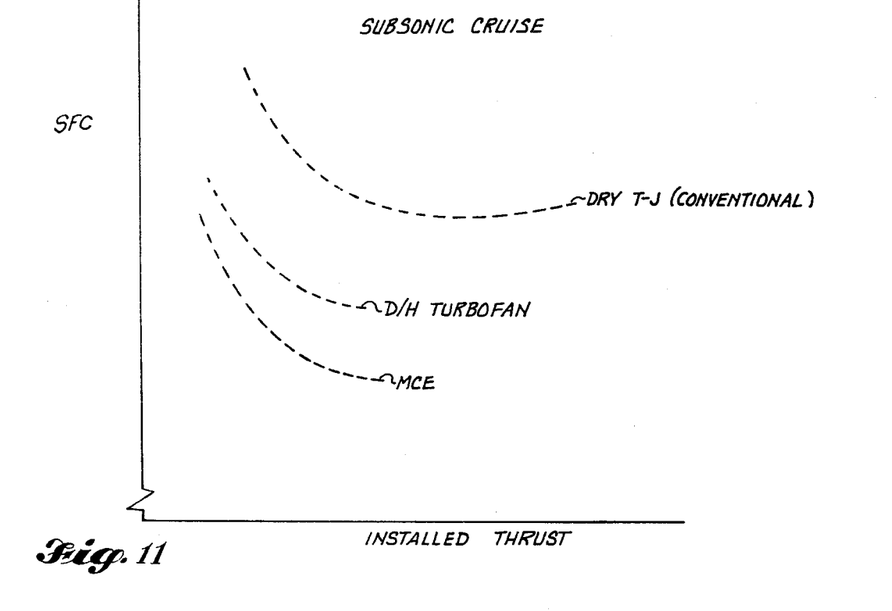
FIGS. 11 and 12 are comparison plots of installed thrust versus specific fuel consumption for subsonic cruise and supersonic cruise respectively.

FIG. 11 illustrates the improvements that are derived with the MCE relative to the other types of SST engines. The engine cycle characteristics of the MCE that are desirable at takeoff are also desirable at subsonic cruise (high BPR, low $R_{fan}$). These cycle characteristics would normally produce a poor engine cycle at supersonic cruise, primarily because the thrust lapse rate is very high with increasing flight speed for high BPR turbofans. In order to improve the thrust at this condition, lower BPR and higher $R_{fan}$ is required in the case of the conventional turbofan. The MCE however, alleviates this problem by switching the forward AIV. The fan flow is then heated and allowed to expand through a turbine, forming a turbojet cycle in principle.

Figure 12:
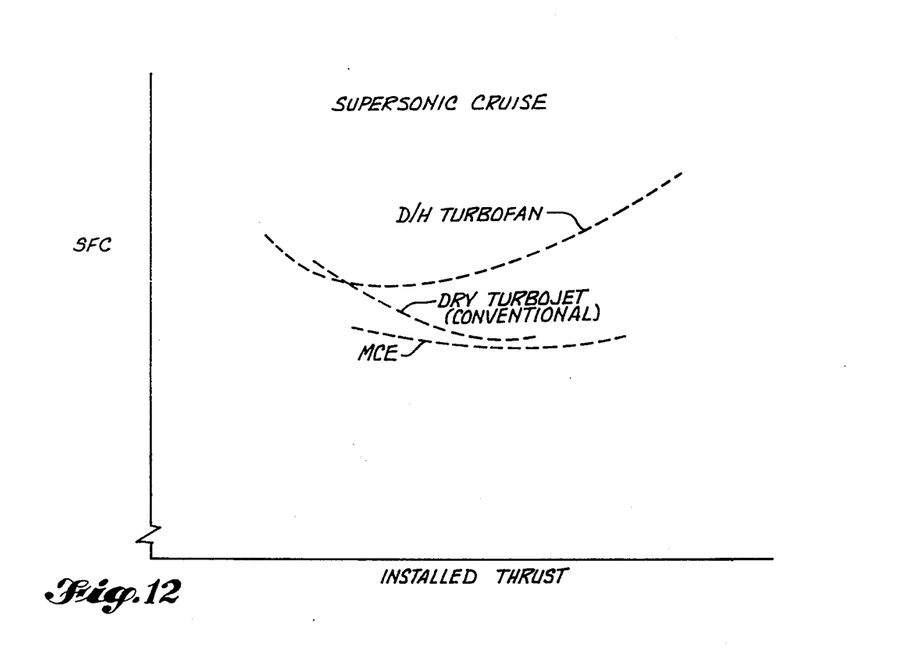

FIG. 12 compares the fuel consumption at supersonic cruise, and the MCE is very nearly equal to the dry turbojet in SFC, and significantly better than the turbofan at the airplane match point (Thrust = Drag). The thrust of the MCE in the low mode at maximum climb power is about 40% greater than the conventional turbojet at equal sea-level airflow as shown in FIG. 12.

Supersonic Thrust

Figure 13:
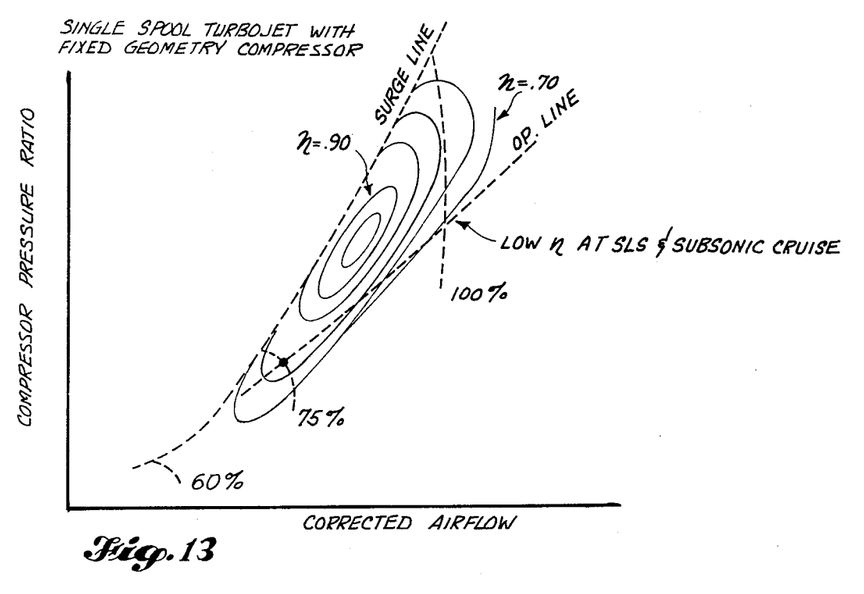
FIGS. 13, 14 and 15 are plots of corrected airflow versus compressor pressure ratio.
Figure 14:
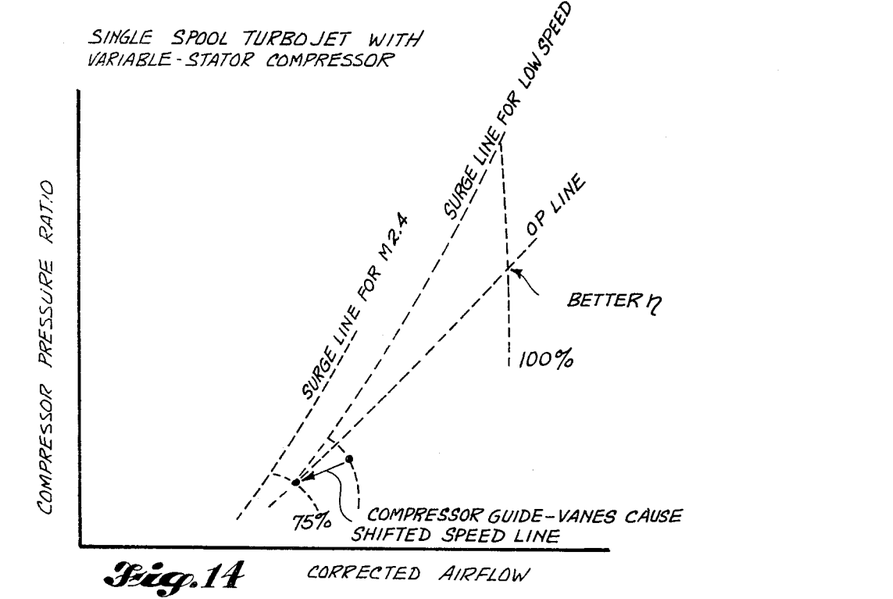

Supersonic thrust increase is a fundamental advantage of the MCE that is not normally possible to achieve with conventional engines. In order to describe this, it is necessary to understand how a conventional single-spool turbojet engine is controlled and matched for good supersonic and subsonic cruise performance. FIG. 13 shows a typical fixed-geometry turbojet compression map. Stable engine operation is possible only in a region to the right of the surge line. The point shown on the 75% speed line would be a desirable operating condition with a desired amount of "surgemargin". This point represents a single spool turbojet engine with the RPM fixed at the design level (100% $N_1$). The 75% corrected speed line ($N_1/\sqrt{\theta_{T_2}}$) represents 100% $N_1$ at Mach 2.4 at or above 36,000 feet. As the engine accelerates from sea level to this condition, all operating points will travel along the operating line shown in FIG. 13. This assumes a fixed burner temperature, a fixed area turbine, and fixed $N_1$. The basic problem with this engine is the poor compression efficiency at the lower Mach numbers. Takeoff thrust would be poor and subsonic fuel consumption would be high because of the reduced compressor efficiency. The efficiency "islands" shown in FIG. 13 are lines of constant efficiency, and in order to improve the efficiency, the operating line must be moved upward near the 100% speed line. This can be done quite easily by reducing the turbine flow area, and FIG. 14 shows the effect of doing this.

The low Mach number operation can be improved by reducing the turbine size. However, the operating point at Mach 2.4 is now in the unstable region to the left of the surge line. This is a dilemma that has plagued engine designers ever since the first military airplanes were designed for supersonic cruise. Variable area turbines would be a feasible solution to this problem, except that the extreme temperature environment makes their use difficult and relatively impractical for commercial aircraft. Surge bleed valves placed at the compressor exit could also be used to provide extra flow area. However, this would impose a thrust and SFC penalty at supersonic cruise. The normal method that is employed is to use variable stators in the compressor stages to change the compressor flow characteristics. This technique can be used to either increase or decrease the flow at any compressor speed. FIG. 14 illustrates how this technique is used to alter the compressor flow characteristic (normally viewed as a compressor map shift) to obtain the necessary surge margin at Mach 2.4. The airflow through the compressor has been reduced and this consequently causes a proportionate decrease in thrust.

Figure 15:
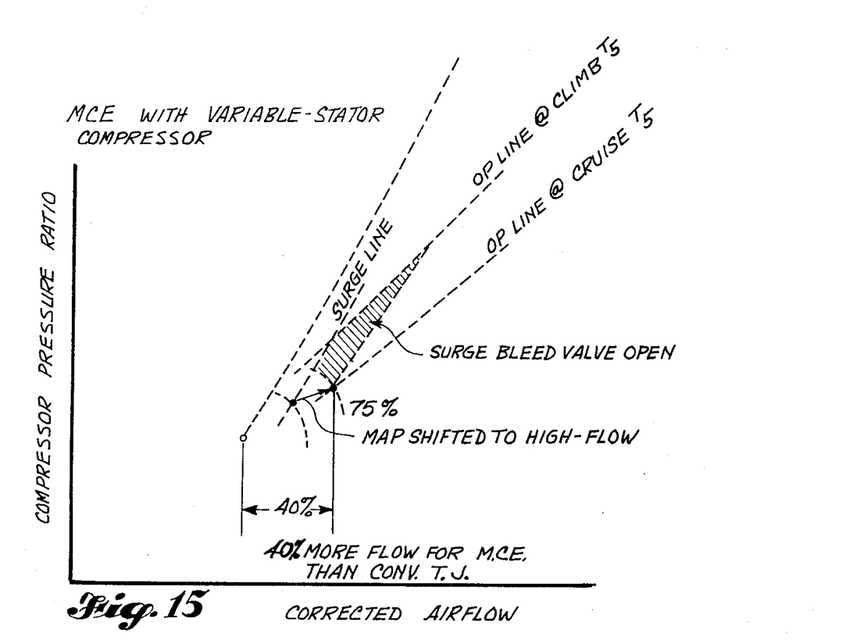

The MCE can utilize the variable stator compressor to better advantage. The outer flow path (the fan stream) of the MCE is essentially a single spool turbojet. FIG. 15 shows the variable compressor which would represent the fan stream with the airflow increased at Mach 2.4. The match point selected for the MCE produces a very poor efficiency at the higher compressor speeds. However, since the MCE switches to the high BPR mode for takeoff and subsonic cruise, the engine does not incur an SFC or thrust penalty. When the front AIV is switched to the high bypass position, Fan 2 inlet temperature decreases because the Fan 1 supercharging effect is removed. This increases the corrected speed and the corrected airflow of Fan 2. The increased Fan 2 corrected flow satisfactorily matches the turbine flow requirement when the second burner is turned off. During transonic climb in the low mode, the poor efficiency condition would exist, however, the burner temperature is increased for maximum climb power (about 700° F greater than Mach 2.4 cruise temperature) and consequently this shifts the operating line to the left. A surge bleed valve is then used in the Fan 2 exit duct to keep the compressor operating along a desired line.

FIG. 15 shows the operating line for maximum climb power without surge bleed and with surge bleed. The surge bleed does reduce thrust and increases SFC; however, this is only a temporary operating condition and relatively small amounts of fuel are used here. The surge valve would be closed for supersonic and subsonic cruise conditions where most of the mission fuel is consumed. The value of the high-flowed compressor in the MCE relative to the low-flowed compressor of the conventional turbojet is typically 20% to 50% increase in thrust, depending upon the compromises taken in the design of the conventional turbojet.

Increased Fan Stream Pressure Ratio

Flow and pressure normally increase in the same direction in variable compressors (due to the fundamental law of fluid mechanics in the blade rows). There is consequently a desirable increase in pressure ratio in the MCE fan stream. The fan stream pressure ratio is on the low side of ideal (approximately 4.5:1) because the two 2.5:1 and 3.0:1 fans were picked for best SFC at Mach .9. High-flow gives the equivalent pressure ratio of about 5.5:1 in a low-flowed compressor (sea level properties). This feature improves the SFC of the MCE at supersonic cruise.

Lower HPC Exit Temperature

At Mach 2.4 cruise the ram-compression of the air entering the engine raises its temperature from −70° F below zero to +380° F. The LP and HP compressors raise the temperature again to very high levels approaching normal burner exit temperatures at high compressor pressure ratios. The compressor exit air is used to cool the turbine, and there is no cooling source to cool the compressor in a normal engine. The blade metal temperatures must therefore be kept at a reasonably low level (around 1500° F). Best SFC's are achieved with high $R_{poa}$ ($R_{poa}$ = 20 to 30), but in a conventional turbofan 20:1 $R_{poa}$ would produce about 1800° F compressor exit temperature at Mach 2.4. The MCE at 20:1 produces a compatible 1500° F, however.

The fundamental benefit is a result of being able to reduce the LPC flow and delivering more flow to Fan 2. It is difficult to understand how this comes about. However, to the experienced engine designer, the HPC sees a reduced flow from the LPC due to the fact that a larger portion of Fan 1 flow is sent into Fan 2. This reduces the flow into the LPC and the HPC spools down to a lower speed and pressure to match the reduced LPC flow. The overall pressure ratio is thereby reduced and the compressor exit temperature is lowered. Thus, the MCE can have a higher $R_{poa}$ for improved subsonic SFC and a lower compressor exit temperature for long-life at supersonic cruise.

It will be recognized by persons skilled in this art that the nomenclature used herein and in the appended claims has been altered in some respects for purposes of convenience. For example, the terminology forward fan and aft fan or forward blade element and aft blade element and first and second fans has been used to describe fan members located generally in the forward region of the engine, and usually known as "front fans". The general term "blade elements" may be used to describe engine components such as, but not limited to, compressor blades, turbine blades, and fan blades. Passageways may be variously described as inner, intermediate, and outer, or as fan duct, or core engine, passageways. Persons skilled in this art will readily recognize the equivalency of such terms. Also, reasonable equivalency of terminology should be applied wherein components such as splitters are sometimes called annular walls, and first, second and third passageways are variously described.

Modifications and improvements to the embodiments and concepts disclosed here will readily occur to persons skilled in this art in the light of this disclosure. Accordingly, it is intended in the appended claims to cover all such modifications and improvements.

What is claimed is:

1. In a multicycle engine for a supersonic aircraft which includes a forwardly located fan means; a core gas generator including compressor, combustor, and turbine stages; an aft turbine stage located downstream of said core gas generator and a second combustor stage located upstream of and adjacent to said aft turbine stage to provide combustion gases acting directly on said aft turbine stage; a method for improving engine cycle efficiency comprising;

passing air through said fan means and said core gas generator and discharging it into a region surrounding said aft turbine stage;

passing air through said fan means and around said core gas generator then into and through said second combustor stage; and switching the air passing through said core gas generator from its path into said region surrounding said aft turbine stage such that it passes into and through said second combustor stage and said aft turbine stage.

2. The method of claim 1 wherein said forwardly located fan means comprises first and second fan stages and said method includes:

passing air through said first fan stage to a region surrounding said second fan stage and directly to a discharge nozzle; and delivery air from a region surrounding said first fan stage to said second fan stage.

3. The method of claim 2 additionally comprising passing air through both said first and second fan stages in series for delivery to said second combustor stage.

4. The method of claim 1 wherein said method includes:

switching the air passing around said core gas generator from its path into and through said second combustor stage such that it passes around said second combustor stage and is discharged in a region surrounding said aft turbine stage.

* * * * *